E. GILLIAM.
Fruit-Gatherer.
No. 54,527.
Patented May 8. 1866.
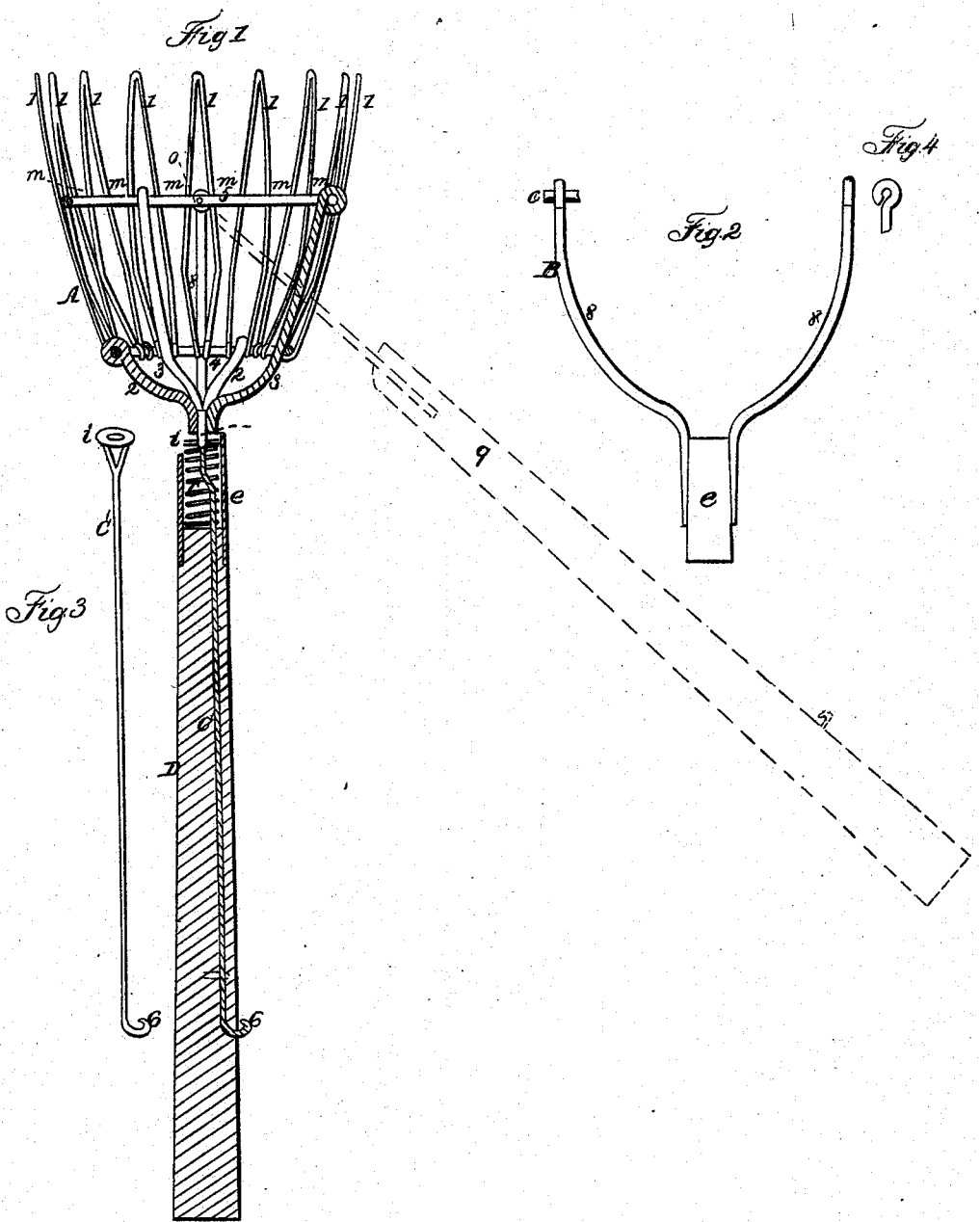

UNITED STATES PATENT OFFICE.

EDWARD GILLIAM, OF ALLEGHENY CITY, PENNSYLVANIA.

IMPROVEMENT IN FRUIT-GATHERERS.

Specification forming part of Letters Patent No. 54,527, dated May 8, 1866.

*To all whom it may concern:*

Be it known that I, EDWARD GILLIAM, of the city and county of Allegheny, and State of Pennsylvania, have invented a new and useful Improvement in Fruit-Gatherers; and I do hereby declare that the following is a full and exact description thereof, reference being had to the accompanying drawings, and to the letters of reference marked thereon.

My invention consists in the combination and arrangement of a basket, yoke, spring, and handle, arranged and operating in the manner hereinafter described.

To enable others skilled in the art to make and use my invention, I will proceed to describe its construction and operation.

In the accompanying drawings, Figure 1 represents a longitudinal section of my improved fruit-gatherer. Fig. 2 represents a front elevation of the yoke for the basket. Fig. 3 represents a front elevation of the catch which is used in connection with a coil-spring for holding the fruit-basket in the desired position when gathering fruit. Fig. 4 represents the bearings in the yoke for the trunnions of the fruit-basket.

In the drawings, A represents the fruit-basket, which consists of a series of wires bent in the form represented in Fig. 1 and marked 1. These are secured to two rings, (marked 4 and 5,) which are held and supported by the arms marked 2 and 3, which are united to the projecting point, (marked $x$.)

The ring 5 of the basket A is furnished with trunnions $o$, which have their bearings in the yoke B, which consists of rods 8 and ferrule $e$. (See Fig. 2.) This yoke B and ferrule $e$ is mounted on a handle, (marked D,) inside of which is placed a catch-rod, (marked C',) on the upper end of which is a disk, (marked $i$,) in the center of which is an opening for receiving the projecting point $x$, which is placed central to the bottom of the basket A.

In the upper portion of the ferrule $e$ is placed a spiral spring, (marked C.) This spiral spring is placed around the rod C', and under the disk $i$, and so arranged that the spring C will hold the disk $i$ of the rod C' in contact with the projecting point $x$ of the basket A, and thereby prevent the basket from swinging in its yoke B.

As the construction, arrangement, and operation of the several parts and the relation they bear to each other will readily be seen and understood by the skillful mechanic by reference to the accompanying drawings, I will therefore proceed to describe the operation of my improved fruit-gatherer.

Having all things constructed and arranged as shown in the accompanying drawings, I raise the basket by means of the handle D, so as to bring the fruit within the body-basket and allow the stem of the fruit to pass down between the wires 1 into the spaces $m$. I then give the handle a slight turn, which will break the fruit from the stem or branch of the tree and allow it to drop into the basket A, and when the desired quantity of fruit is collected in the basket A, I then press down or draw on the projection, marked 6, of the catch-rod C', which will compress the spring C and draw down the disk $i$ from off the projecting point $x$ of the basket A and allow it to swing, so that the mouth of the basket will always be uppermost when lowering the basket by inclining the handle, as indicated by the dotted lines marked 9.

Having thus described the nature, construction, and operation of my improvement, what I claim as of my invention is—

The combination of the basket A with the yoke B, spring C, and handle D, constructed, arranged, and operating substantially as herein described, and for the purpose set forth.

EDWARD GILLIAM.

Witnesses:
JAMES J. JOHNSTON,
ALEXANDER HAYS.